US011914944B2

(12) United States Patent
Ono

(10) Patent No.: US 11,914,944 B2
(45) Date of Patent: Feb. 27, 2024

(54) DISPLAY CONTROL METHOD, SERVER APPARATUS, AND SYSTEM

(71) Applicant: CASIO COMPUTER CO., LTD., Tokyo (JP)

(72) Inventor: Manato Ono, Wako (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/207,984

(22) Filed: Mar. 22, 2021

(65) Prior Publication Data

US 2021/0303769 A1 Sep. 30, 2021

(30) Foreign Application Priority Data

Mar. 25, 2020 (JP) ................................ 2020-054582

(51) Int. Cl.
*G06F 40/106* (2020.01)
*G06F 3/04845* (2022.01)
*G06T 11/20* (2006.01)

(52) U.S. Cl.
CPC ........ *G06F 40/106* (2020.01); *G06F 3/04845* (2013.01); *G06T 11/206* (2013.01)

(58) Field of Classification Search
CPC ... G06F 40/106; G06F 3/04845; G06T 11/206
See application file for complete search history.

(56) References Cited

U.S. PATENT DOCUMENTS

| 5,838,317 | A | * | 11/1998 | Bolnick | G06F 3/005 715/764 |
| 2004/0255254 | A1 | * | 12/2004 | Weingart | G06F 3/0483 715/793 |
| 2007/0244672 | A1 | * | 10/2007 | Kjaer | G06F 40/18 703/2 |
| 2008/0034317 | A1 | * | 2/2008 | Fard | G06T 13/80 715/781 |
| 2008/0168341 | A1 | * | 7/2008 | Payette | G06F 40/18 715/212 |
| 2012/0096397 | A1 | * | 4/2012 | Ording | G06F 3/0482 715/802 |
| 2013/0174041 | A1 | * | 7/2013 | Chakravarthy | G06F 3/0482 715/733 |

(Continued)

FOREIGN PATENT DOCUMENTS

JP 2019-003390 A 1/2019
JP 7180630 B2 11/2022

OTHER PUBLICATIONS

Notice of Reasons for Refusal dated Nov. 21, 2023 received in Japanese Patent Application No. JP 2022-183030.

*Primary Examiner* — Daniel W Parcher
(74) *Attorney, Agent, or Firm* — Scully, Scott, Murphy & Presser, P.C.

(57) ABSTRACT

A display control method includes: aligning a plurality of classification groups into which a plurality of display elements are grouped by classifications thereof; and displaying the plurality of display elements belonging to the plurality of aligned classification groups on a display device in a first display mode in which one association group among a plurality of association groups into which the plurality of display elements are grouped by association thereamong is prioritized over the other association groups.

15 Claims, 19 Drawing Sheets

(56) References Cited

U.S. PATENT DOCUMENTS

| | | | |
|---|---|---|---|
| 2013/0205239 A1* | 8/2013 | Holland | G06F 9/451 |
| | | | 715/766 |
| 2014/0109001 A1* | 4/2014 | Louch | G09G 5/14 |
| | | | 715/794 |
| 2018/0121028 A1* | 5/2018 | Kuscher | G06F 9/44 |
| 2018/0321887 A1* | 11/2018 | Masumoto | G06F 3/1203 |
| 2019/0208030 A1 | 7/2019 | Taniyama et al. | |
| 2021/0303769 A1 | 9/2021 | Ono | |

\* cited by examiner

FIG. 5

| C1 | C2 | C3 | C4 | C5 | |
|---|---|---|---|---|---|
| ID | OBJECT NAME | CLASSIFICATION | COORDINATES | ASSOCIATION No. | OTHERS |
| 001 | GRAPH G1 | GRAPH | (1, 2.5) | 1 | ... |
| 002 | MATHEMATICAL EXPRESSION F1 | MATHEMATICAL EXPRESSION | (4, 0.5) | 1 | ... |
| 003 | NUMERICAL TABLE T1 | NUMERICAL TABLE (MATHEMATICAL EXPRESSION) | (8, 3) | 1 | ... |
| 004 | NUMERICAL TABLE TP1 | NUMERICAL TABLE (PLOT) | (2, 10) | 1 | ... |
| 005 | GRAPH G2 | GRAPH | (18, 0.5) | 2 | ... |
| 006 | MATHEMATICAL EXPRESSION F2 | MATHEMATICAL EXPRESSION | (15, 8) | 2 | ... |
| 007 | NUMERICAL TABLE T2 | NUMERICAL TABLE (MATHEMATICAL EXPRESSION) | (23, 7) | 2 | ... |

| ID (C1) | OBJECT NAME (C2) | CLASSIFICATION (C3) | COORDINATES (C4) | ASSOCIATION No. (C5) | OTHERS |
|---|---|---|---|---|---|
| 001 | GRAPH G1 | GRAPH | (1, 2.5) | 1 | ... |
| 002 | MATHEMATICAL EXPRESSION F1 | MATHEMATICAL EXPRESSION | (4, 0.5) | 1 | ... |
| 003 | NUMERICAL TABLE T1 | NUMERICAL TABLE (MATHEMATICAL EXPRESSION) | (8, 3) | 1 | ... |
| 004 | NUMERICAL TABLE TP1 | NUMERICAL TABLE (PLOT) | (2, 10) | 1 | ... |
| 005 | GRAPH G2 | GRAPH | (18, 0.5) | 2 | ... |
| 006 | MATHEMATICAL EXPRESSION F2 | MATHEMATICAL EXPRESSION | (15, 8) | 2 | ... |
| 007 | NUMERICAL TABLE T2 | NUMERICAL TABLE (MATHEMATICAL EXPRESSION) | (23, 7) | 2 | ... |
| 008 | NUMERICAL TABLE TP2 | NUMERICAL TABLE (PLOT) | - | 2 | ... |

FIG. 17

| C1 | C2 | C3 | C4 | C5 | |
|---|---|---|---|---|---|
| ID | OBJECT NAME | CLASSIFICATION | COORDINATES | ASSOCIATION No. | OTHERS |
| 001 | GRAPH G1 | GRAPH | (1, 2.5) | 1 | ... |
| 002 | MATHEMATICAL EXPRESSION F1 | MATHEMATICAL EXPRESSION | (4, 0.5) | 1 | ... |
| 003 | NUMERICAL TABLE T1 | NUMERICAL TABLE (MATHEMATICAL EXPRESSION) | (8, 3) | 1 | ... |
| 004 | NUMERICAL TABLE TP1 | NUMERICAL TABLE (PLOT) | (2, 10) | 1 | ... |
| 005 | GRAPH G2 | GRAPH | (18, 0.5) | 2 | ... |
| 006 | MATHEMATICAL EXPRESSION F2 | MATHEMATICAL EXPRESSION | (15, 8) | 2 | ... |
| 007 | NUMERICAL TABLE T2 | NUMERICAL TABLE (MATHEMATICAL EXPRESSION) | (23, 7) | 2 | ... |
| 008 | NUMERICAL TABLE TP2 | NUMERICAL TABLE (PLOT) | (16, 11) | 2 | ... |

D3

DISPLAY CONTROL METHOD, SERVER APPARATUS, AND SYSTEM

CROSS-REFERENCE TO RELATED APPLICATIONS

This application is based on and claims priority under 35 USC 119 from Japanese Patent Application No. 2020-054582 filed on Mar. 25, 2020, the contents of which are incorporated herein by reference.

TECHNICAL FIELD

The present disclosure relates to a display control method, a server apparatus, and a system.

BACKGROUND ART

Information and communication technology (ICT) apparatuses have been introduced into school education mainly in Europe and America in recent years. Accordingly, as described in JP-A-2019-003390, for example, cases of using electronic learning materials in classes or periodic tests of a school are increasing and the use of electronic learning materials is expected to expand in the future.

In general, electronic learning materials in the related art are designed on an assumption of a display device having a certain large screen size such as a personal computer or a tablet. For this reason, when an electronic learning material is used from a terminal having a screen size smaller than an assumed screen size, such as a smartphone, visibility of the electronic learning material may significantly decrease and consequentially operability may decrease.

Such a problem may occur not only in an electronic learning material used in school education but also in various applications providing a graphical user interface.

SUMMARY OF INVENTION

An object of one aspect of the present disclosure is to provide a technique for implementing high visibility regardless of a screen size.

A display control method relate includes: aligning a plurality of classification groups into which a plurality of display elements are grouped by classifications thereof; and displaying the plurality of display elements belonging to the plurality of aligned classification groups on a display device in a first display mode in which one association group among a plurality of association groups into which the plurality of display elements are grouped by association thereamong is prioritized over the other association groups.

According to the above aspect, high visibility can be implemented regardless of a screen size.

Further features of the present disclosure will become apparent from the following description of exemplary embodiments (with reference to the attached drawings).

BRIEF DESCRIPTION OF DRAWINGS

FIG. 5 is a diagram showing an example of data in a database that manages object information;
FIG. 15 is a diagram showing data in a database that manages object information;
FIG. 17 is a diagram showing data in a database that manages object information.

DESCRIPTION OF EMBODIMENTS

Figure 1:
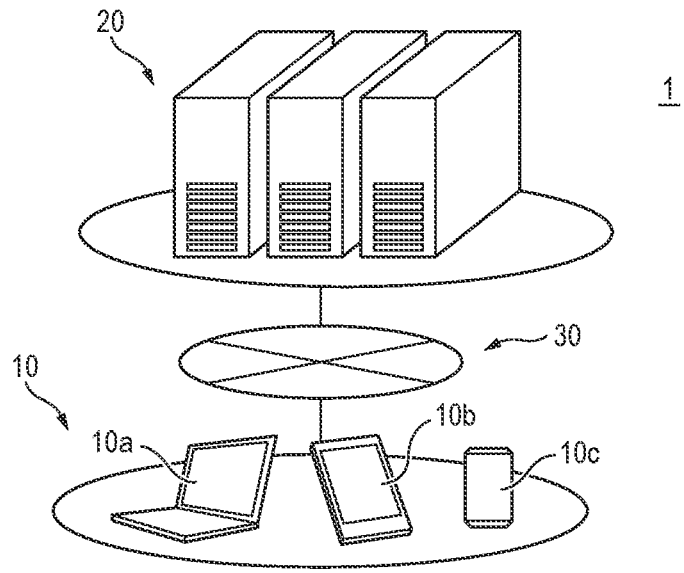
FIG. 1 is a diagram showing a configuration of a system.
Figure 2:
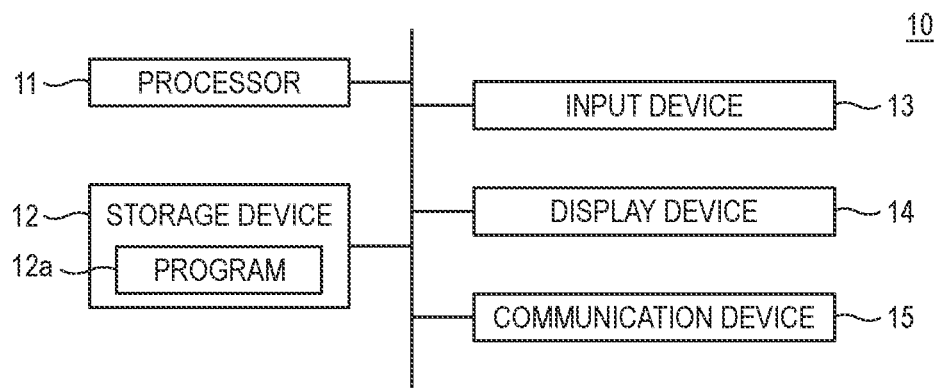
FIG. 2 is a block diagram showing a physical configuration of a client terminal.
Figure 3:
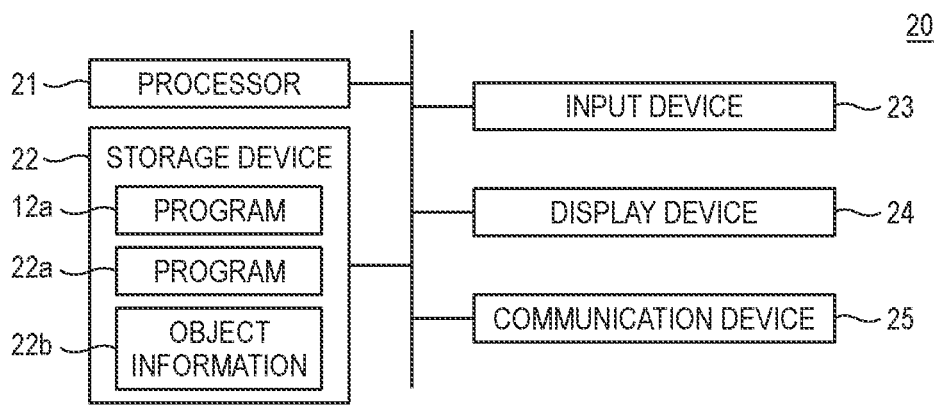
FIG. 3 is a block diagram showing a physical configuration of a server.

FIG. 1 is a diagram showing a configuration of a system 1. FIG. 2 is a block diagram showing a physical configuration of a client terminal 10. FIG. 3 is a block diagram showing a physical configuration of a server 20. The configuration of the system 1 will be described with reference to FIGS. 1 to 3.

The system 1 is not particularly limited, and is, for example, a system that performs various mathematical operations according to an input from a user and displays an operation result using a graph, a numerical table, or the like. As shown in FIG. 1, the system 1 includes the client terminal 10 and the server 20 that are connected via a network 30. The network 30 is, for example, the Internet, and may be another type of network such as a dedicated line. Hereinafter, a case of the system 1 being a web application system will be described as an example, and the system 1 may be a client-server system.

The client terminal 10 includes a display device and is operated by a user of the system 1. When the system 1 is a web application system, a web browser may be installed in the client terminal 10. For example, the client terminal 10 transmits a request to the server 20 in response to an input by the user, and provides an application screen to the user based on a response from the server 20 to the request.

As shown in FIG. 1, the client terminal 10 may be a notebook computer 10*a*, a tablet computer 10*b*, or a computer 10*c* that is a smartphone. The client terminal 10 is not limited to a mobile terminal and may be, for example, a stationary computer.

As shown in FIG. 2, the client terminal 10 includes, for example, a processor 11, a storage device 12, an input device 13, a display device 14, and a communication device 15.

The processor 11 is, for example, an electric circuit including a central processing unit (CPU), and executes a program 12*a* stored in the storage device 12. The processor 11 may include other types of processors such as a graphics processing unit (GPU), an application specific integrated circuit (ASIC), a field-programmable gate array (FPGA), and a digital signal processor (DSP).

The storage device 12 is, for example, an arbitrary semiconductor memory, and includes a volatile memory such as a random access memory (RAM), and a nonvolatile memory such as a read only memory (ROM) and a flash memory. The storage device 12 may include a magnetic storage device, an optical storage device, and other types of storage devices. The storage device 12 stores the program 12*a* executed by the processor 11. The program 12*a* stored in the storage device 12 may be downloaded from the server 20 via the network 30 and the communication device 15, for example.

The input device 13 includes, for example, a keyboard, a mouse, and a touch panel, and may also include a voice input device such as a microphone or other types of input devices. The display device 14 is, for example, a liquid crystal display, an organic EL display, a plasma display, and a CRT display, and may also be another type of display device such as a matrix LED panel. The communication device 15 is, for example, a wireless communication device such as a Wi-Fi (registered trademark) module, and may also be a wired communication device.

The server 20 is a server apparatus that processes a request from the client terminal 10 and transmits a processing result to the client terminal 10. The server 20 may be a single device or a set of a plurality of devices including a web server, an application server, a database server, and the like. The server 20 may be a distributed computing system.

As shown in FIG. 3, the server 20 includes, for example, a processor 21, a storage device 22, an input device 23, a display device 24, and a communication device 25.

The processor 21 is, for example, an electric circuit including a central processing unit (CPU), and executes a program 22*a* stored in the storage device 22. The processor 21 may include other types of processors such as a graphics processing unit (GPU), an application specific integrated circuit (ASIC), a field-programmable gate array (FPGA), and a digital signal processor (DSP).

The storage device 22 is, for example, an arbitrary semiconductor memory, and includes a volatile memory such as a random access memory (RAM), and a nonvolatile memory such as a read only memory (ROM) and a flash memory. The storage device 22 may include a magnetic storage device, an optical storage device, and other types of storage devices. The storage device 22 stores the program 22*a* executed by the processor 21 and object information 22*b* to be described later. The storage device 22 may store the program 12*a* that is distributed to and executed by the client terminal 10.

The input device 23 includes, for example, a keyboard, a mouse, and a touch panel, and may also include a voice input device such as a microphone or other types of input devices. The display device 24 is, for example, a liquid crystal display, an organic EL display, a plasma display, and a CRT display, and may also be another type of display device such as a matrix LED panel. The communication device 25 may be a wireless communication device or a wired communication device.

In the system 1 having the above configuration, when the user activates the web browser installed in the client terminal 10 and inputs a predefined URL, the client terminal 10 can download the program 12*a* operating on a web browser provided by the server 20 to the storage device 12 and execute the program 12*a*. It is also possible to access a web application specified by a URL. When the user performs various operations on an application screen displayed on the web browser, the client terminal 10 can transmit a request to the server 20 and update the application screen based on a response from the server 20.

Figure 4:
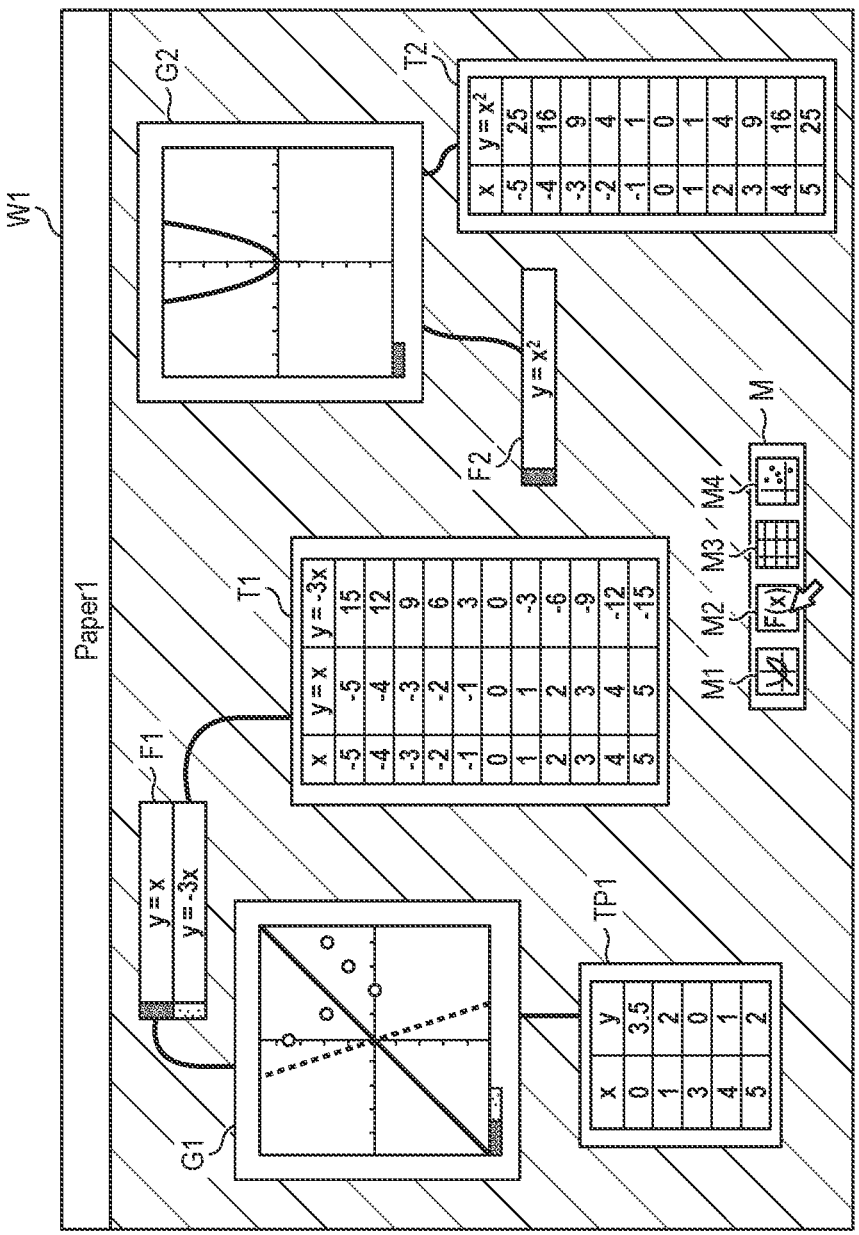
FIG. 4 is a diagram showing an example of an application screen displayed on the client terminal having a relatively large screen size.

FIG. 4 is a diagram showing an example of an application screen displayed on the client terminal 10 having a relatively large screen size. FIG. 5 is a diagram showing data D1 in a database that manages object information. Hereinafter, an application screen displayed when the client terminal 10 having a relatively large screen size, for example, the notebook computer 10*a*, accesses the server 20 will be described with reference to FIGS. 4 and 5.

A window W1 shown in FIG. 4 is a window of the web browser. The window W1 displays an application screen including a plurality of display elements (hereinafter, referred to as "sticky note object"). Each of the sticky note objects displayed on the application screen has properties including ID, object name, classification, coordinates, and association No. In the client terminal 10, the sticky note objects using these properties and a relationship between the sticky note objects are displayed on the web browser. Each of the sticky note objects includes a mathematical element selected from a graph, a mathematical expression, and a numerical table. A mathematical element included in a sticky note object is capable of being associated with another predefined mathematical element.

Properties of the sticky note objects will be described in more detail. ID is information for uniquely identifying a sticky note object. Object name is an editable name attached to a sticky note object. Classification is information indicating a classification of a sticky note object. FIGS. 4 and 5 show four classifications of "graph", "mathematical expression", "numerical table (mathematical expression)", and "numerical table (plot)". Coordinates are coordinates representing a sticky note object, and are coordinates of, for example, a position in an upper left corner of the sticky note object, although not particularly limited thereto. Association No. is information for specifying association among sticky note objects. Sticky note objects associated with each other have the same association No. In addition, there are various properties that characterize a sticky note object. The other properties include, for example, a property common to all sticky note objects such as the size of the sticky note objects, and a property specific to sticky note objects of a specific classification.

These properties are stored in the storage device 22 as the object information 22*b*. More specifically, for example, as shown in FIG. 5, the data D1 in a table form is stored in a database. In the example shown in FIG. 5, ID, object name, classification, coordinates, and association No. of a sticky note object are respectively stored in a column C1, a column C2, a column C3, a column C4, and a column C5. By managing the object information 22*b* by the server 20 in this manner, the user can display a sticky note object created by the user on the web browser of any client terminal 10.

The sticky note objects will be described in more detail for each classification. Among the sticky note objects displayed in FIG. 4, a sticky note object whose classification is "graph" (hereinafter referred to as a graph sticky note) includes a graph sticky note G1 and a graph sticky note G2. The graph sticky notes are sticky note objects that display a function graph, a statistical graph, or both. The graph sticky note G1 displays a function graph and a statistical graph. The function graphs displayed on the graph sticky note G1 are graphs of two linear functions, and the statistical graph displayed on the graph sticky note G1 is a scatter diagram. The graph sticky note G2 only displays a function graph. The function graph displayed on the graph sticky note G2 is a graph of a quadratic function.

Among the sticky note objects displayed in FIG. 4, a sticky note object whose classification is "mathematical expression" includes a mathematical expression sticky note F1 and a mathematical expression sticky note F2. The mathematical expression sticky notes are sticky note objects that display mathematical expressions of functions input by the user. The mathematical expression sticky note F1 displays two mathematical expressions (y=x, y=−3x). The mathematical expression sticky note F2 displays one mathematical expression (y=$x^2$).

Among the sticky note objects displayed in FIG. 4, a sticky note object whose classification is "numerical table (function)" includes a numerical table sticky note T1 and a numerical table sticky note T2. The numerical table sticky notes are sticky note objects that display, in a table form, a set of an independent variable (x) and a dependent variable (y) of a function input to a mathematical expression sticky note. The numerical table sticky note T1 displays a set of one independent variable (x) and two dependent variables (y: =x, y: =−3x). The numerical table sticky note T2 displays a set of one independent variable (x) and one dependent variable (y: =$x^2$).

Among the sticky note objects displayed in FIG. 4, a sticky note object whose classification is "numerical table (statistics)" includes a numerical table sticky note TP1. The numerical table sticky note is a sticky note object that displays a numerical table in which a value is input by the user. The numerical table sticky note TP1 displays a set of two variables x, y for specifying plot points of the statistical graph displayed on the graph sticky note G1.

A menu list M displayed in FIG. 4 includes menus (menu M1 to menu M4) corresponding to the above-described four classifications of sticky note objects. The menu list M is displayed, for example, by clicking an area on the application screen where there is no sticky note object. The menu M1 is a menu for adding a graph sticky note. The menu M2 is a menu for adding a mathematical expression sticky note. The menu M3 is a menu for adding a numerical table sticky note whose classification is "numerical table (function)". The menu M4 is a menu for adding a numerical table sticky note whose classification is "numerical table (statistics)".

Figure 6:
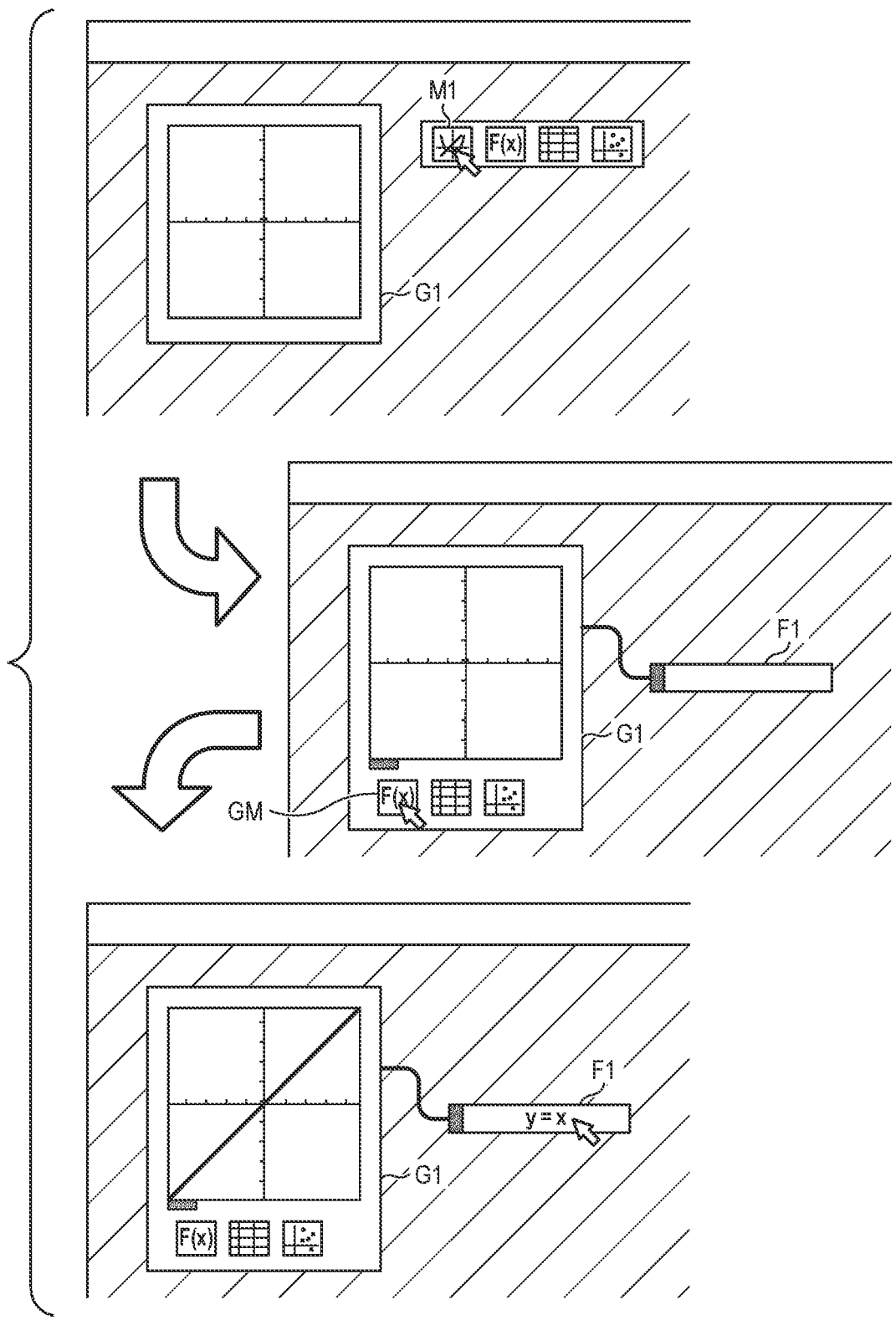
FIG. 6 is a diagram showing an example of a procedure for generating a sticky note object.
Figure 7:
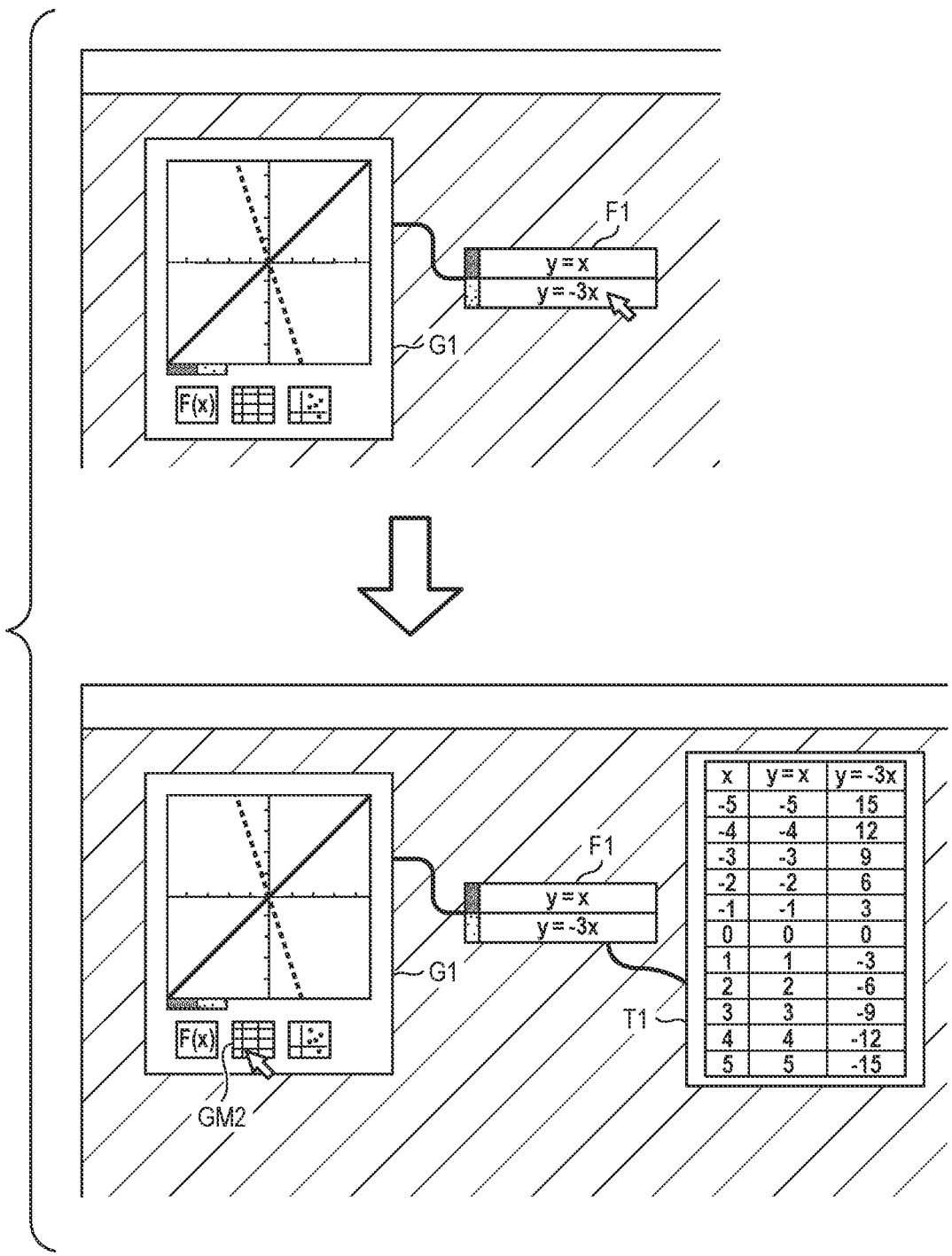
FIG. 7 is another diagram showing the example of a procedure for generating a sticky note object.
Figure 8:
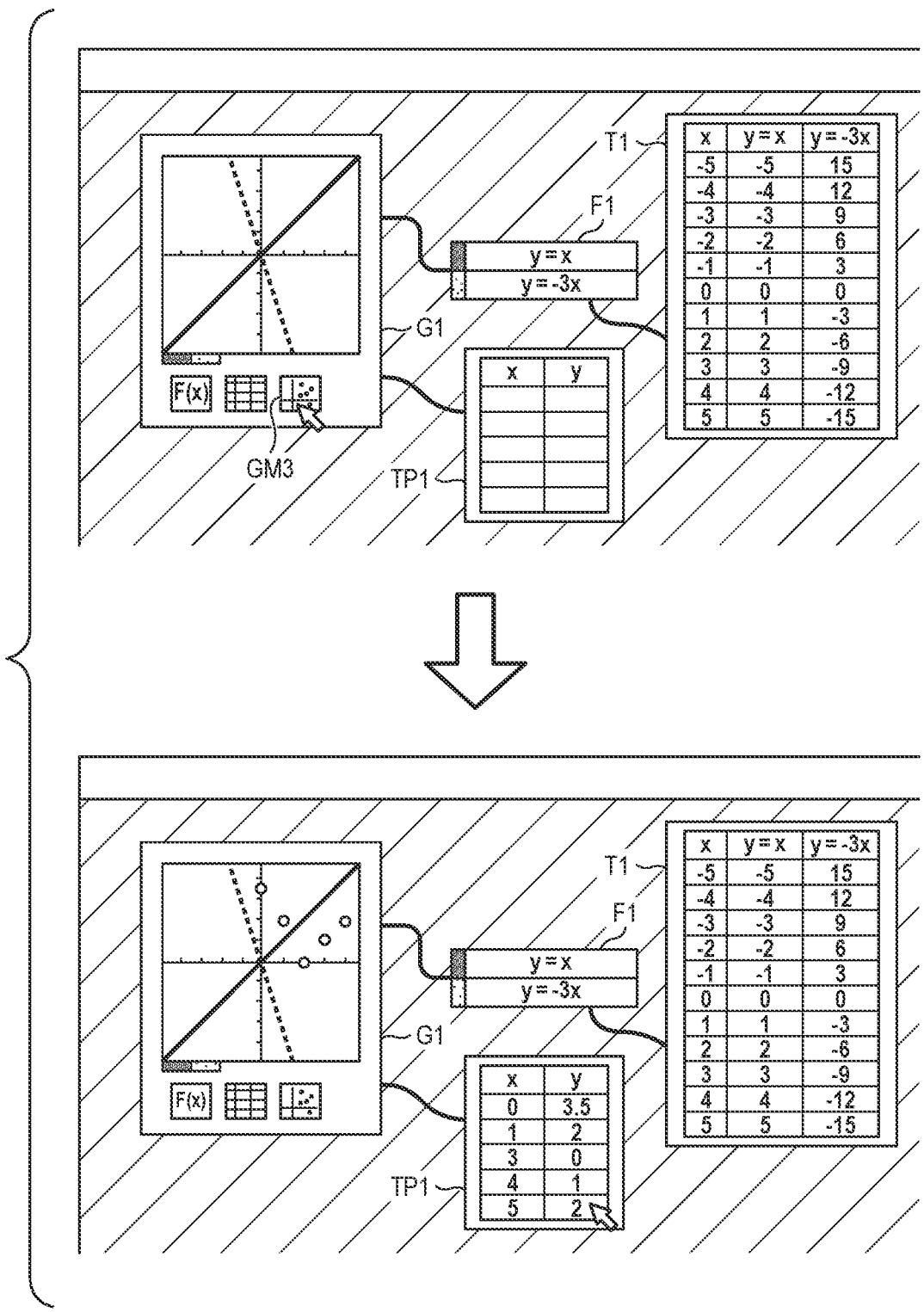
FIG. 8 is further another diagram showing the example of a procedure for generating a sticky note object.

FIGS. 6 to 8 are diagrams showing an example of a procedure for generating a sticky note object. Hereinafter, a procedure of generating a plurality of sticky note objects displayed on the window W1 shown in FIG. 4 on the application screen will be described with reference to FIGS. 6 to 8.

First, when the user presses an arbitrary area on the application screen in a state where no sticky note object is displayed on the application screen, the menu list M is displayed. Thereafter, when the user presses the menu M1 on the menu list M, the graph sticky note G1 is generated and displayed on the application screen as shown in an upper part of FIG. 6. At this time, no graph is displayed on the graph sticky note G1, and only the scale of a graph is displayed.

When the user presses the graph sticky note G1, a plurality of menus are displayed on the graph sticky note G1. Further, when the user presses a menu GM1 arranged on a left side, the mathematical expression sticky note F1 is generated and displayed on the application screen in association with the graph sticky note G1 as shown in a middle part of FIG. 6. The association among the sticky note objects is expressed by displaying a line connecting the associated sticky note objects.

Next, when the user inputs a mathematical expression (y=x) to the mathematical expression sticky note F1, a graph of the mathematical expression input to the mathematical expression sticky note F1 is displayed on the graph sticky note G1 as shown in a lower part of FIG. 6. Further, when the user inputs a second mathematical expression (y=−3x) to the mathematical expression sticky note F1, a graph of the second mathematical expression input to the mathematical expression sticky note F1 is displayed on the graph sticky note G1 as shown in an upper part of FIG. 7.

Thereafter, when the user presses a menu GM2 arranged in the middle among the plurality of menus displayed on the graph sticky note G1, as shown in a lower part of FIG. 7, the numerical table sticky note T1 is generated and displayed on the application screen in association with the mathematical expression sticky note F1. In the numerical table sticky note T1, a plurality of sets of independent variables and dependent variables used for graph display on the graph sticky note G1 are displayed in a list.

When the user inputs a combination of the variables x, y in the numerical table sticky note TP1, as shown in a lower part of FIG. 8, a plot point is drawn in a position on a graph corresponding to the input information. As a result, a scatter diagram on the graph sticky note G1 is displayed.

By repeating the above-described operation for generating the graph sticky note G2, the mathematical expression sticky note F2, and the numerical table sticky note T2, the application screen displayed on the window W1 shown in FIG. 4 is displayed, and the D1 shown in FIG. 5 is stored in the database generated in the storage device 22 of the server 20.

Figure 9:
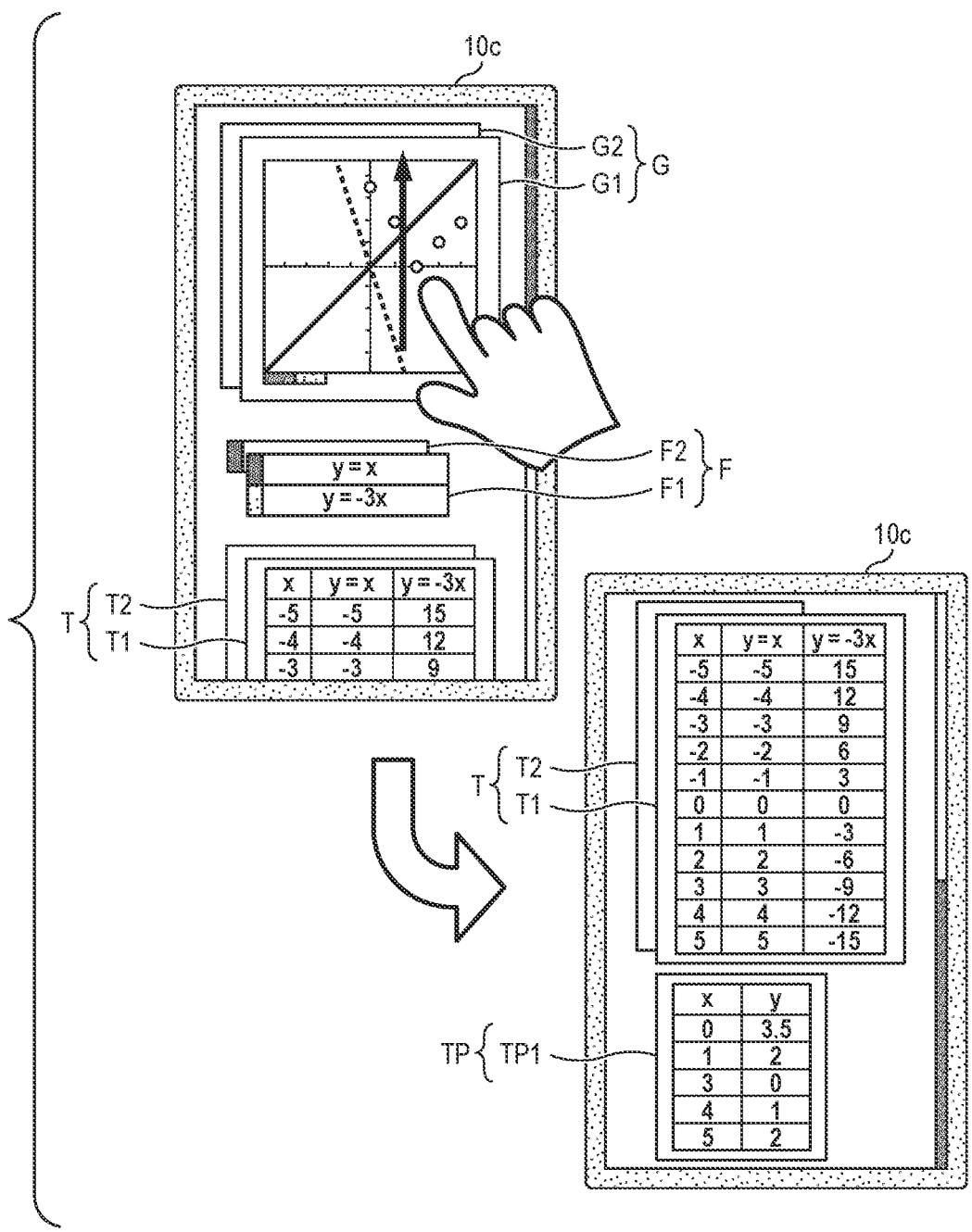
FIG. 9 is a diagram showing an example of an operation on an application screen displayed on the client terminal having a relatively small screen size.
Figure 10:
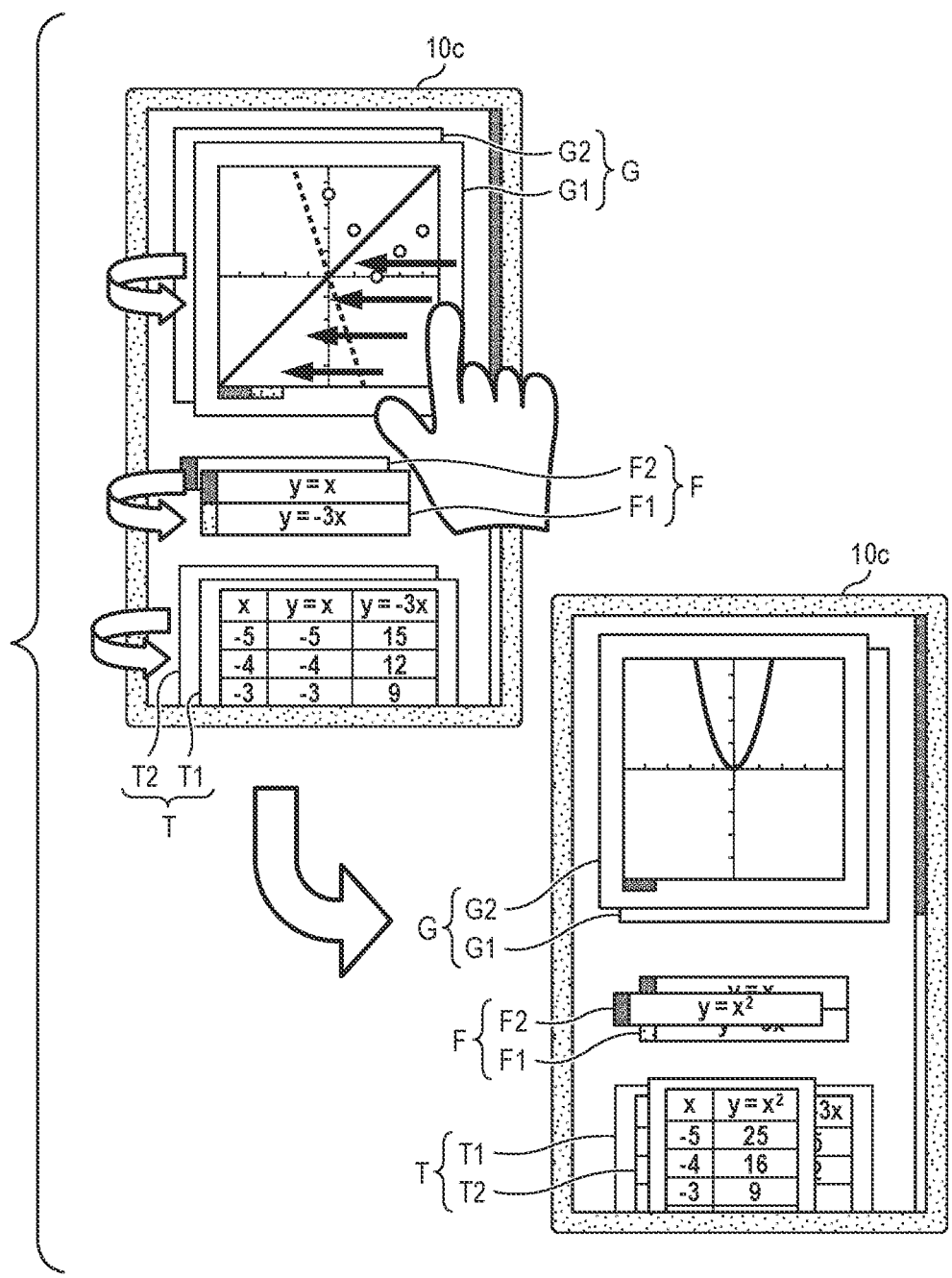
FIG. 10 is a diagram showing an example of another operation on the application screen displayed on the client terminal having a relatively small screen size.
Figure 11:
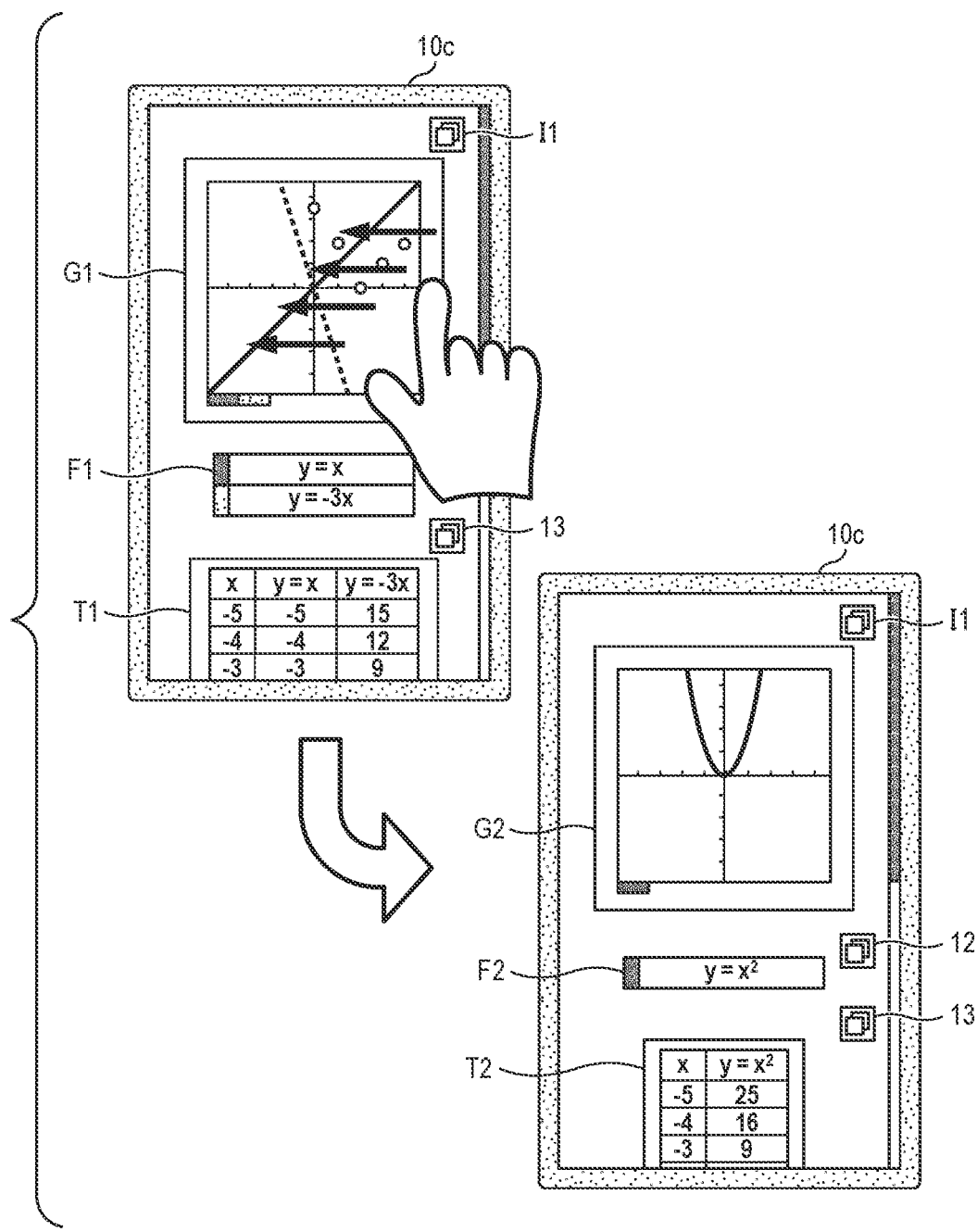
FIG. 11 is a diagram showing an example of an operation on another application screen displayed on the client terminal having a relatively small screen size.

FIGS. 9 to 11 are diagrams showing an operation example on an application screen displayed on the client terminal 10 having a relatively small screen size. Hereinafter, an application screen displayed when the client terminal 10 having a relatively small screen size, for example, the computer 10c which is a smartphone, accesses the server 20 will be described with reference to FIGS. 9 and 10. Hereinafter, a case will be described as an example in which the object information 22b of a plurality of sticky note objects shown in FIG. 4 generated using the computer 10a having a relatively large screen size is read from the server 20 and the application screen is displayed on the computer 10c.

The computer 10c first accesses a web application provided by the server 20 and acquires the object information 22b of the plurality of sticky note objects generated by the computer 10a. Thereafter, by performing the following processing, an application screen capable of implementing high visibility and consequentially high operability is displayed even on a small screen.

First, the computer 10c performs a first grouping processing of grouping the plurality of sticky note objects into a plurality of classification groups according to classifications of the sticky note objects. That is, the first grouping processing includes grouping a plurality of mathematical elements stored in the storage device 22 into a plurality of classification groups based on classifications of the plurality of mathematical elements. Specifically, the computer 10c performs grouping based on classification properties of the sticky note objects. In this example, a total of four classification groups are generated, that is, a graph group G including the graph sticky note G1 and the graph sticky note G2, a mathematical expression group F including the mathematical expression sticky note F1 and the mathematical expression sticky note F2, a numerical table group T including the numerical table sticky note T1 and the numerical table sticky note T2, and a numerical table group TP including the numerical table sticky note TP1.

The computer 10c further performs a second grouping processing of grouping the plurality of sticky note objects into a plurality of association groups according to association among sticky note objects. That is, the second grouping processing includes grouping the plurality of mathematical elements into a plurality of association groups based on association among the plurality of mathematical elements. Specifically, the computer 10c groups the sticky note objects based on association No. properties of the sticky note objects. In this example, a total of two association groups are generated, that is, a first association group including the graph sticky note G1, the mathematical expression sticky note F1, the numerical table sticky note T1, and the numerical table sticky note TP1, and a second association group including the graph sticky note G2, the mathematical expression sticky note F2, and the numerical table sticky note T2.

Next, the computer 10c performs an alignment processing of aligning the generated four classification groups. The alignment processing may include, for example, processing of arranging the plurality of classification groups in a certain direction. The direction in which the plurality of classification groups are arranged (hereinafter, referred to as an alignment direction) may be, for example, as shown in FIG. 9, a longitudinal direction of the display device 14 of the computer 10c. In a case where the application screen is displayed on a part of the display device 14 of the computer 10c, for example, in a case where the size of the web browser is adjusted, it is that the alignment direction is desired to be a longitudinal direction of a display region in which the application screen is displayed (a display region of the web browser in this example). In other words, the alignment direction is preferably the longitudinal direction of the display region included in the display device 14. Accordingly, in a case where no scroll operation is performed, it is possible to display a relatively large number of classifications of sticky note objects of different classification groups on one screen.

In general, upper, lower, left, and right sides of the application screen are determined and the alignment direction may be an upper-lower direction of the application screen displayed on the display device 14 of the computer 10c. For example, in the case shown in FIG. 9, the upper-lower direction coincides with the longitudinal direction of the display device 14 of the computer 10c. When the orientation of the same computer 10c is rotated by 90 degrees, the upper-lower direction coincides with a latitudinal direction of the display device 14 of the computer 10c. Accordingly, a normal scroll direction of a display screen in a general web browser and the alignment direction coincide with each other, and thus good visibility and operability can be maintained.

An alignment order of the classification groups may be a predefined order such as an order of the graph group G, the mathematical expression group F, the numerical table group T, and the numerical table group TP. The alignment order of the classification groups may be automatically determined according to an arbitrary criterion such as an order in which the number of objects of the same classification is large. Further, the alignment order of the classification groups may be an order specified by the user.

Finally, the computer 10c performs a first display processing of displaying the plurality of sticky note objects belonging to the plurality of aligned classification groups on the display device 14 in a display mode in which one of the plurality of association groups is prioritized over the other association groups (hereinafter, referred to as a first display mode). The display mode in which one association group is prioritized over the other association groups, that is, the first display mode, is a mode in which the one association group prioritized over the other association groups (hereinafter, referred to as a priority group) is displayed foremost among the plurality of association groups. More specifically, as shown in FIGS. 9 and 10, the priority group may be displayed foremost among the plurality of association groups, and the other association groups may be displayed on a back surface of the priority group. In this case, as shown in FIGS. 9 and 10, a plurality of sticky note objects belonging to different association groups and to the same classification group may be displayed in a manner of overlapping with each other. Accordingly, it is possible to determine only at a glance whether an association group other than the priority group includes a sticky note object of the same classification group as any classification group included in the priority group. In addition, as shown in FIG. 11, a priority group may be displayed foremost among a plurality of association groups, and the other association groups may be minimized and displayed as icons or may not be displayed. That is, in the present specification, "one association group is displayed foremost among a plurality of association groups" corresponds to a case in which one association group is displayed foremost, regardless of whether a plurality of sticky note objects belonging to another association group are displayed. By displaying one association group (priority group) foremost, it is possible to avoid a situation in which a sticky note object of the priority group is blocked by a sticky note object of another group and cannot be seen.

The priority group may be determined based on, for example, coordinate information of sticky note objects belonging to an association group. That is, the priority group may be determined based on arrangements of a plurality of sticky note objects in a second display mode to be described later. For example, a sticky note object having coordinates closest to reference coordinates (for example, top left of a display region) may be specified from coordinate information included in the object information 22b, and an association group to which the specified sticky note object belongs may be determined as a priority group. The priority group may also be automatically determined according to another arbitrary criterion. By automatically determining the priority group, no additional operation of the user for determining the priority group would be necessary. Further, an association group specified by the user may be determined as the priority group.

As described above, by performing the first grouping processing, the second grouping processing, the alignment processing, and the first display processing, for example, as shown in FIG. 9, the computer 10c can preferentially display sticky note objects belonging to one association group.

When the user pays attention to a certain sticky note object, a sticky note object associated with the certain sticky note object is more likely to be referred to by the user than a sticky note object not associated with the certain sticky note object. For example, when the user pays attention to the graph sticky note G1 of FIG. 9, it would be convenient if the user can immediately check mathematical expressions and numerical values of the graph displayed on the graph sticky note G1. By preferentially displaying sticky note objects belonging to one association group, a sticky note object associated with a sticky note object of interest is also preferentially displayed similarly to the sticky note object of interest. Therefore, the user can check these sticky note objects simultaneously or quickly. Therefore, even in a case where the computer 10c has a small screen, the application can be used without inconvenience and high visibility can be implemented regardless of the screen size.

In addition, since the computer 10c arranges a plurality of classification groups in a certain direction in the alignment processing, the user can easily confirm an associated sticky note object by a simple operation even in a case where all sticky note objects belonging to the priority group do not fit in the screen. Specifically, for example, as shown in FIG. 9, when the user simply performs a flick operation or a swipe operation in the alignment direction of classification groups to scroll the application screen, a sticky note object that does not fit in the application screen can be displayed and confirmed on the screen. In particular, as shown in FIG. 9, by arranging a plurality of classification groups in the longitudinal direction of the display region, it is possible to efficiently display a plurality of sticky note objects belonging to the priority group in the display region. Accordingly, when the sticky objects are sequentially viewed, the number of times of a flick operation or a swipe operation can be reduced to a minimum limit. Therefore, higher operability can be implemented.

Further, the computer 10c performs a switching processing of switching the priority group from a certain association group to another association group in accordance with a predefined operation. In this case, the predefined operation may include a flick operation or a swipe operation. Specifically, for example, as shown in FIGS. 10 and 11, it is desirable that the priority group is switched by the user performing a flick operation or a swipe operation in a direction intersecting the alignment direction of the classification groups. In the computer 10c, as shown in FIGS. 9 to 11, scrolling of the screen and switching of an association group to be preferentially displayed are appropriately performed relative to the direction of the flick operation or the swipe operation of the user. Therefore, the user can intuitively operate the application screen and high operability is implemented by the system 1.

FIGS. 10 and 11 show a state in which the priority group is switched from the first association group (graph sticky note G1, mathematical expression sticky note F1, numerical table sticky note T1, numerical table sticky note TP1) to the second association group (graph sticky note G2, mathematical expression sticky note F2, numerical table sticky note T2). FIG. 10 shows an example in which an association group other than the priority group is displayed on a back surface of the priority group. FIG. 11 shows an example in which the association group other than the priority group is minimized and displayed as icons (icon I1 to icon I3). In either of the two cases, the user can visually recognize the presence of the association group other than the priority group. In the display mode shown in FIG. 10, since the association group other than the priority group is displayed on the back surface of the priority group, it is easy to image the switching of the priority group by a flick operation or a swipe operation, and it is easy for the user to more intuitively handle the switching operation. In the display mode shown in FIG. 11, since the association group other than the priority group is minimized, the priority group can be displayed in a more easy-to-view manner than in the display mode shown in FIG. 10.

The computer 10c may further perform a resizing processing before performing the first display processing. In the resizing processing, at least a part of a plurality of sticky note objects are resized so that the width of the plurality of sticky note objects in a predefined direction perpendicular to the alignment direction (perpendicular direction) falls within the width of the display region included in the display device 14 in the predefined direction (perpendicular direction). For example, when the width of a part of a plurality of sticky note objects does not fall within the width of the display region of the computer 10c, only the width of the part of the sticky note objects may be reduced to fall within the display region, or all the objects may be uniformly reduced to fall within the display region. Accordingly, the user is not forced to scroll the screen in a direction perpendicular to the alignment direction, and thus it is possible to implement high visibility and consequentially high operability.

Figure 12A:
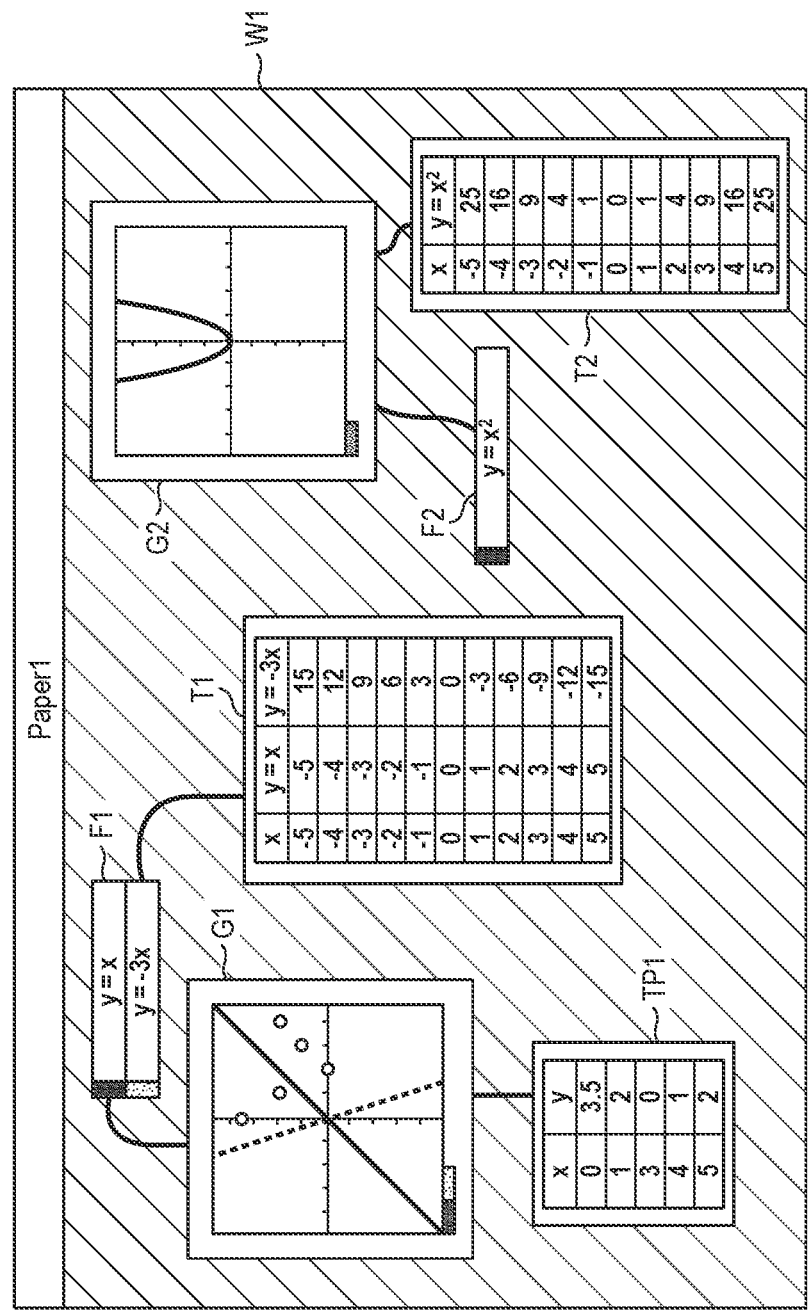
FIG. 12A is a diagram explaining an example of an operation for changing a screen size of an application screen.
Figure 12B:
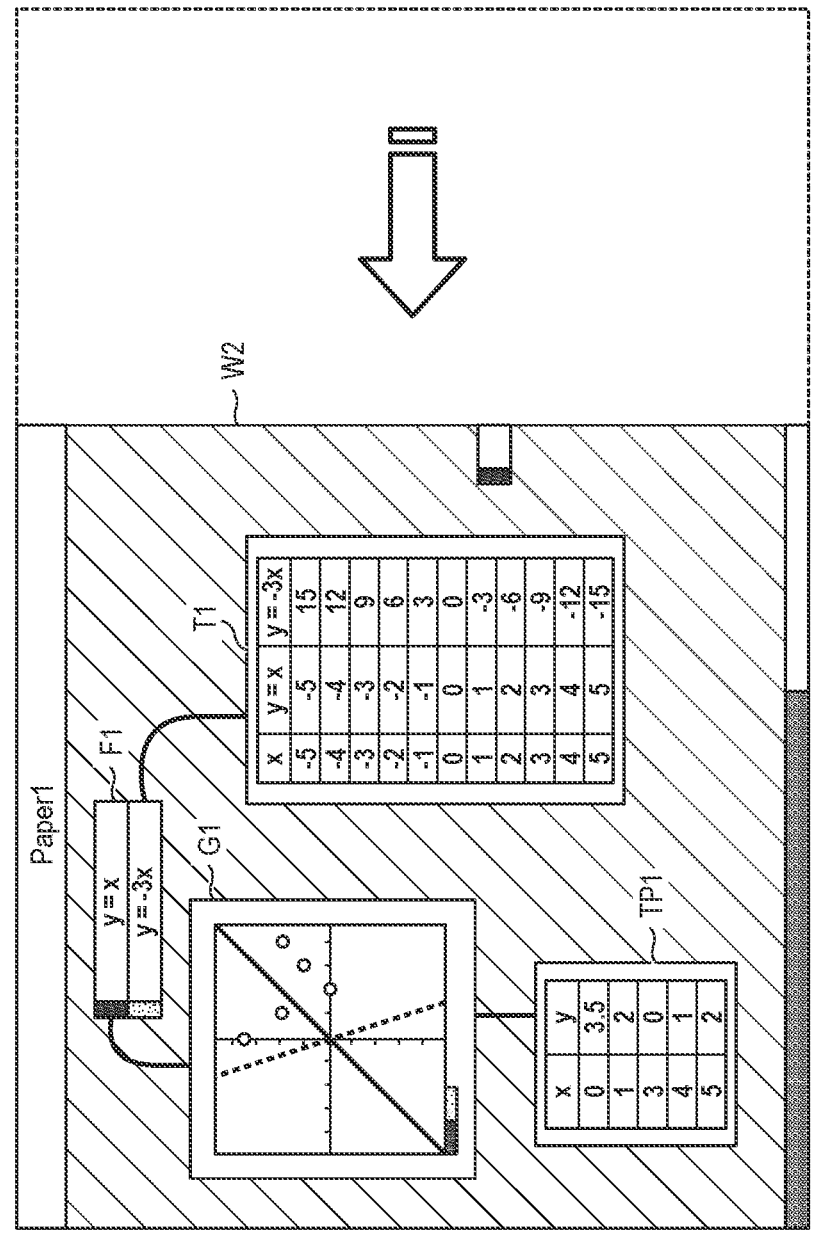
FIG. 12B is a diagram explaining an example of an operation for changing a screen size of an application screen.
Figure 12C:
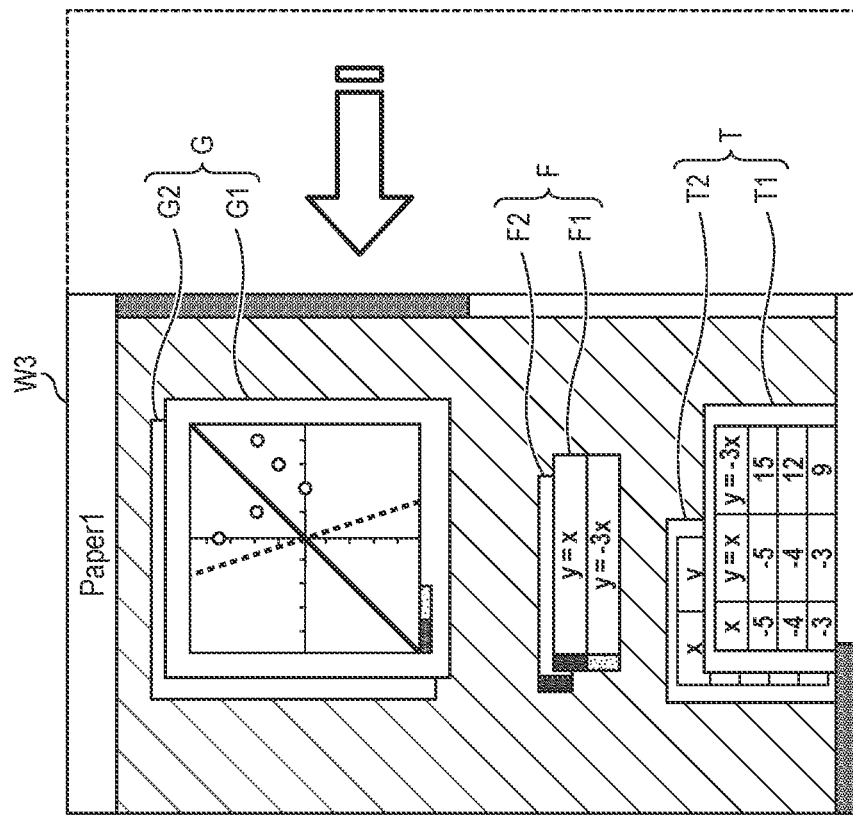
FIG. 12C is a diagram explaining an example of an operation for changing a screen size of an application screen.

The above description described an example in which, when a plurality of sticky note objects generated by the computer 10a having a relatively large screen size are displayed on the computer 10c having a relatively small screen size, the plurality of sticky note objects are displayed in the first display mode. However, the plurality of sticky note objects may also be displayed in the first display mode on the computer 10a having a relatively large screen size. FIGS. 12A to 12C are diagrams explaining an example of an operation for changing the screen size of the application screen. A state of the window transits from a state illustrated in FIG. 12A to a state illustrated in FIG. 12B, and next transits from the state illustrated in FIG. 12B to a state illustrated in FIG. 12C. As shown in FIGS. 12A to 12C, when the window size of the web browser is adjusted and reduced to a predefined size or less, a plurality of sticky note objects may be displayed in the first display mode. FIGS. 12A to 12C show a state in which the plurality of sticky note objects are arranged according to the coordinate properties of the object information 22b in the window W1 whose window size is maximized and a window W2 whose width is slightly reduced from the window W1, and a state in which the plurality of sticky note objects are displayed in the first display mode in a window W3 whose width is further reduced from the window W2.

Figure 13:
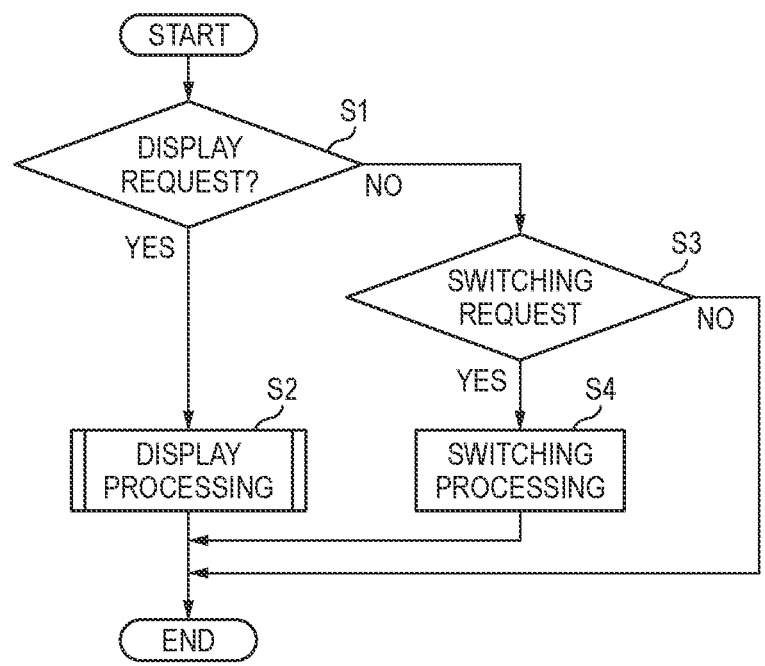
FIG. 13 is an example of a flowchart of processing performed by the system.
Figure 14:
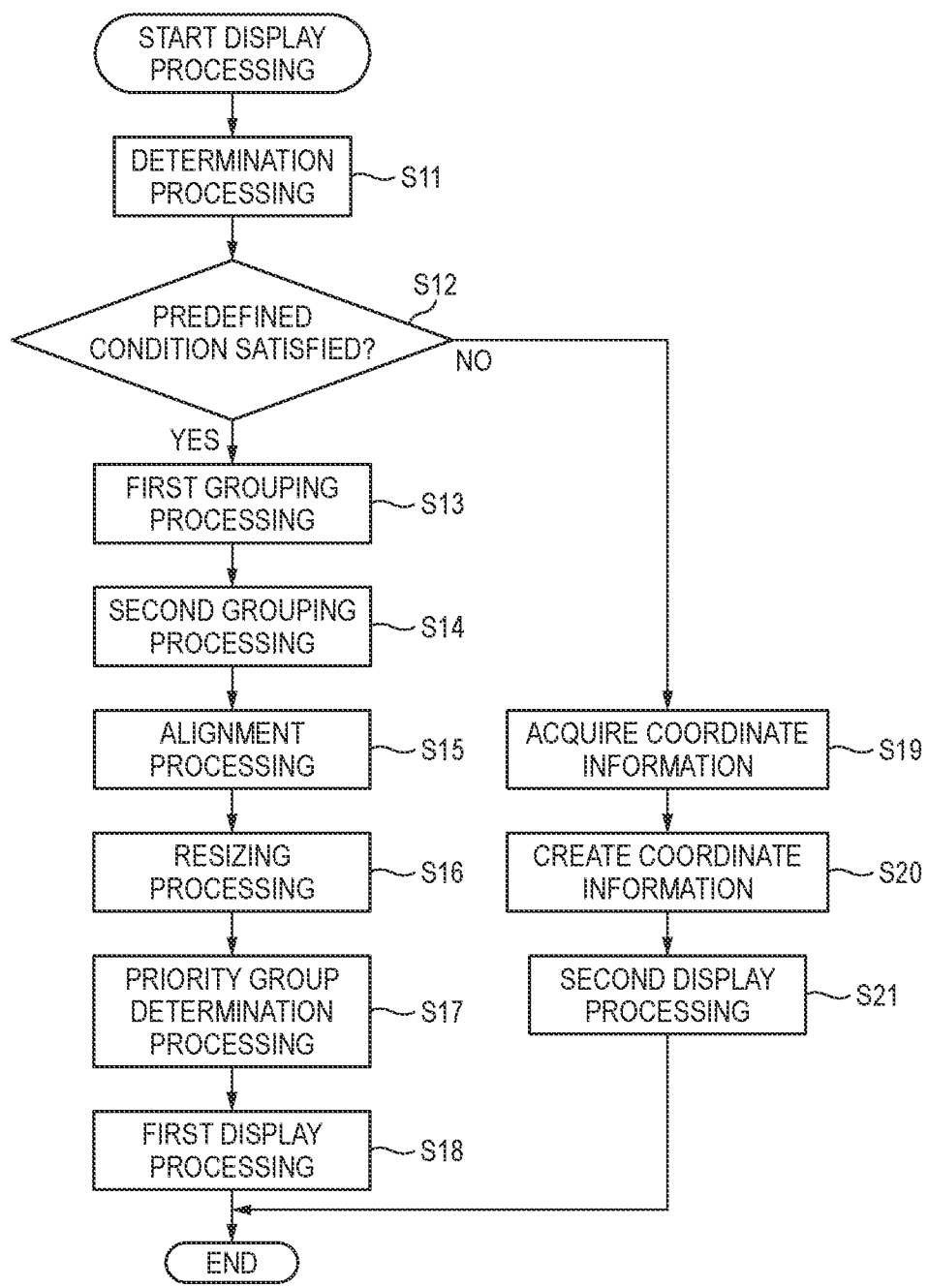
FIG. 14 is an example of a flowchart of a display processing shown in FIG. 13.

FIG. 13 is an example of a flowchart of processing performed by the system 1. FIG. 14 is an example of a flowchart of display processing shown in FIG. 13. Hereinafter, with reference to FIGS. 12A to 12C and FIG. 13, an example of a specific processing procedure of the above-described display control method performed by the system 1 to implement high visibility and consequentially high operability regardless of the screen size will be described. The following description will describe, as an example, a case in which the processing of each step shown in FIGS. 13 and 14 is performed by the client terminal 10, and a part or all of the processing except for the display processing may be performed by the server 20.

The processing shown in FIG. 13 is performed, for example, by the processor 11 of the client terminal 10 executing the program 12a downloaded from the server 20. First, the processor 11 determines whether a display request is detected (step S1). For example, when the web browser reloads a web page by pressing an update button of the web browser or the like, the processor 11 determines that the display request is detected.

When the display request is detected, the processor 11 performs the display processing shown in FIG. 14 (Step S2). When the display processing is started, the processor 11 first performs determination processing (step S11). That is, the processor 11 is an example of a determination processing unit. The determination processing determines whether a predefined condition is satisfied. The predefined condition is a condition for determining that display in the first display mode is desired.

In step S11, the processor 11 may acquire the size of the display region (for example, the window size of the web browser), or may determine whether the predefined condition is satisfied by setting the size of the display region to be within a predefined size as the predefined condition. The processor 11 may acquire information on the client terminal 10, and may determine whether the predefined condition is satisfied based on the acquired information on an assumption that the client terminal 10 is a smartphone. The information on the client terminal 10 may be, for example, information on hardware of the client terminal 10, or information on software such as information on an OS installed in the client terminal 10 and information on the web browser. Whether the client terminal 10 is a smartphone may be estimated from these pieces of information. By the processor 11 performing the determination processing, a plurality of sticky note objects can be displayed in an appropriate display mode.

When the predefined condition is satisfied (step S12: YES), the processor 11 performs the first grouping processing (step S13), the second grouping processing (step S14), the alignment processing (step S15), and the resizing processing (step S16). That is, the processor 11 is an example of a first grouping processing unit, a second grouping processing unit, an alignment processing unit, and a resizing processing unit. Details of the first grouping processing, the second grouping processing, the alignment processing, and the resizing processing are as described above.

Thereafter, the processor 11 performs a priority group determination processing (step S17). That is, the processor 11 is an example of a priority group determination processing unit. In step S17, the processor 11 determines a priority group based on, for example, coordinate information of a sticky note object, although not particularly limited thereto. Specifically, for example, a sticky note object having coordinates closest to the reference coordinates is specified, and an association group to which the specified sticky note object belongs is determined as the priority group.

When the priority group is determined, the processor 11 performs the first display processing (step S18). That is, the processor 11 is an example of a first display processing unit. Details of the first display processing are as described above. When the first display processing ends, the display processing of step S2 ends.

Figure 16:
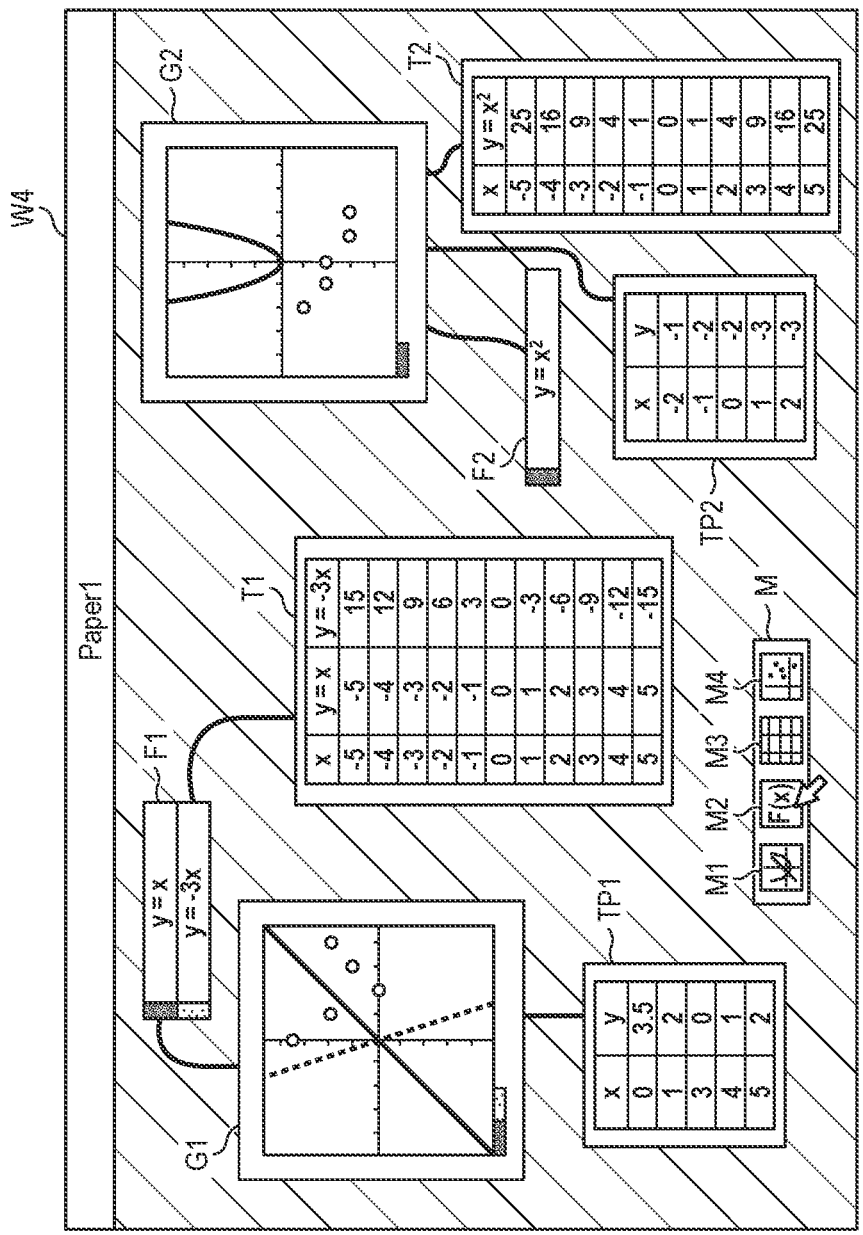
FIG. 16 is a diagram showing another example of the application screen displayed on the client terminal having a relatively large screen size.

On the other hand, when the predefined condition is not satisfied (step S12: NO), the processor 11 acquires coordinate information of a plurality of sticky note objects (step S19), and generates coordinate information for a sticky note object having no coordinate information (step S20). As a case in which there is no coordinate information in properties of a sticky note object, for example, a case is assumed in which a new sticky note object is generated when the application screen is displayed in the first display mode. Specifically, this corresponds to a case in which the user clicks an area in the display region of the computer 10c in which no sticky note object is displayed to add an arbitrary sticky note object, a case in which a menu on a graph sticky note of a priority group is selected to add another sticky note object, or the like. In this case, the computer 10c that receives the operation of adding a new sticky note object generates classification information (classification property) for specifying a classification of the added new sticky note object, and transmits the information to the server 20 to cause the storage device 22 to store the information. Data D2 in a database shown in FIG. 15 shows data when a new numerical table object TP2 is added by selecting a menu on the graph sticky note G2 preferentially displayed in the first display mode. It should be noted here that, in the data D2, coordinate information of the column C4 corresponding to the numerical table object TP2 is empty. When an arbitrary sticky note object is added by clicking an area in which no sticky note object is displayed in the first display mode, association No. of the column C5 is also empty in addition to the coordinate information of the column C4. Thereafter, when the application screen is displayed again on the computer 10a, the processing of step S20 is performed. The processing of step S20 may be performed before the computer 10a displays the application screen again, and may not be performed immediately before the display processing. The coordinate information generated in step S20 is generated such that, for example, when a sticky note object is arranged according to the coordinate information as the numerical table sticky note TP2 shown in FIG. 16, the sticky note object does not overlap with other sticky note objects. As a result, as shown in FIG. 17, data in the database is updated as data D3, and the coordinate information is generated and stored for the added new numerical table object TP2.

When the acquisition and the generation of the coordinate information are completed, the processor 11 performs a second display processing (step S21), and the display processing of step S2 is completed. In the second display processing, a plurality of sticky note objects are displayed on the display device 14 in a second display mode different from the first display mode. Specifically, the processor 11 displays the plurality of sticky note objects on the display device 14 in a manner of not overlapping with each other. More specifically, the processor 11 displays the plurality of sticky note objects on the display device 14 in accordance with coordinate information of the sticky note objects. In such a display mode, when the size of the display region is sufficiently large, all the sticky note objects can be displayed at a time.

When the processor 11 detects no display request in step S1, the processor 11 further determines whether a switching request is detected (step S3). For example, in a case of the wipe operation as shown in FIG. 10 being performed when a plurality of sticky note objects are displayed in the first display mode, the processor 11 determines that a switching request is detected.

Upon detecting the switching request, the processor 11 performs the switching processing (step S4). Details of the switching processing are as described above. Accordingly, an association group different from that before switching is preferentially displayed in the first display mode.

The embodiments described above are specific examples for facilitating understanding of the present disclosure, and the present disclosure is not limited to these embodiments but should be understood to include various modifications and alternative forms of the embodiments described above. For example, it will be understood that various embodiments can be embodied by modifying constituent elements without departing from the spirit and scope of the embodiments. In addition, it will be understood that various embodiments may be implemented by appropriately combining a plurality of constituent elements disclosed in the above-described embodiments. Further, it will be understood by those skilled in the art that various embodiments may be implemented by deleting a part of constituent elements from all the constituent elements shown in the embodiments or adding a part of constituent elements to the constituent elements shown in the embodiments. That is, the program, the display control method, and the system can be variously modified and changed without departing from the scope of the claims.

The embodiments described above described an example in which only a sticky note object that can be associated with another sticky note object is generated. However, a sticky note object that cannot be associated with another sticky note object may be generated as shown in FIGS. 18 and 19.

Figure 18:
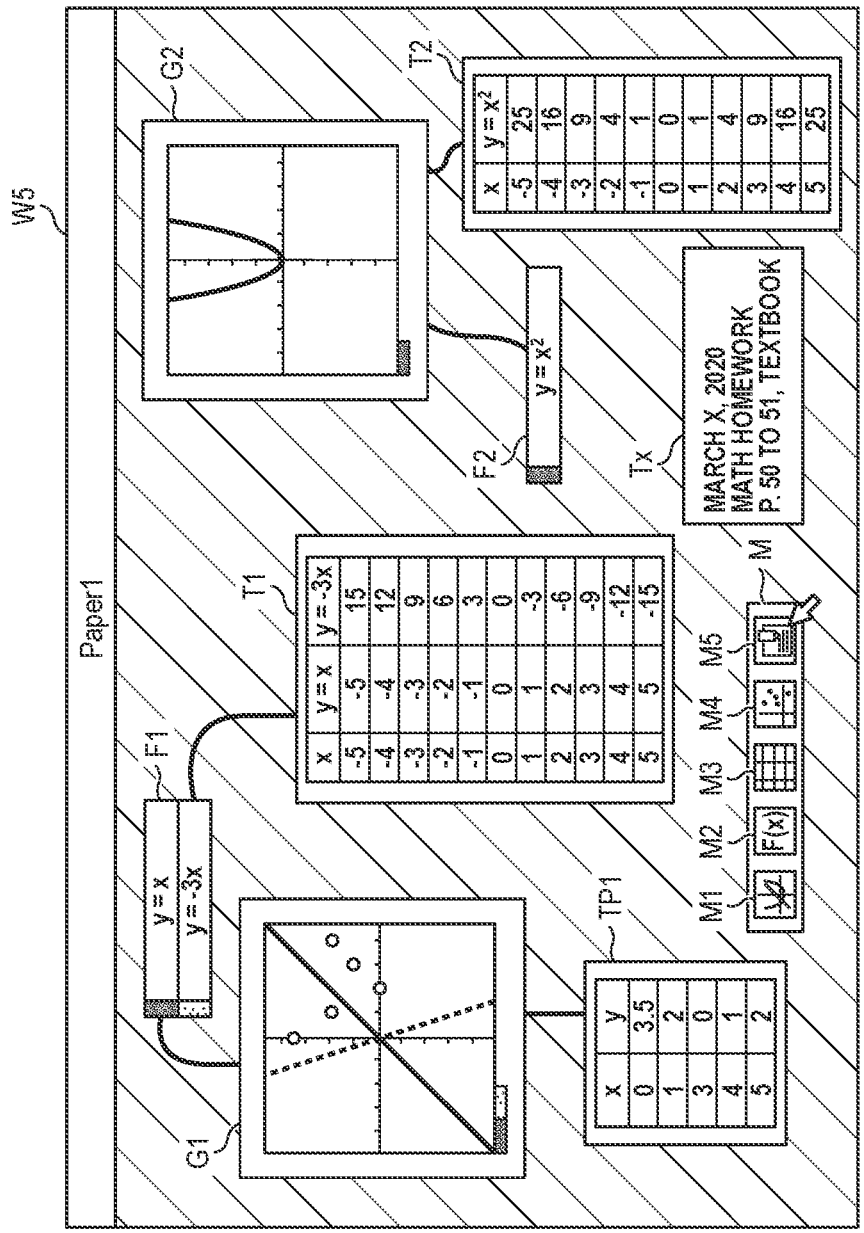
FIG. 18 is a diagram showing another example of the application screen displayed on the client terminal having a relatively large screen size.
Figure 19:
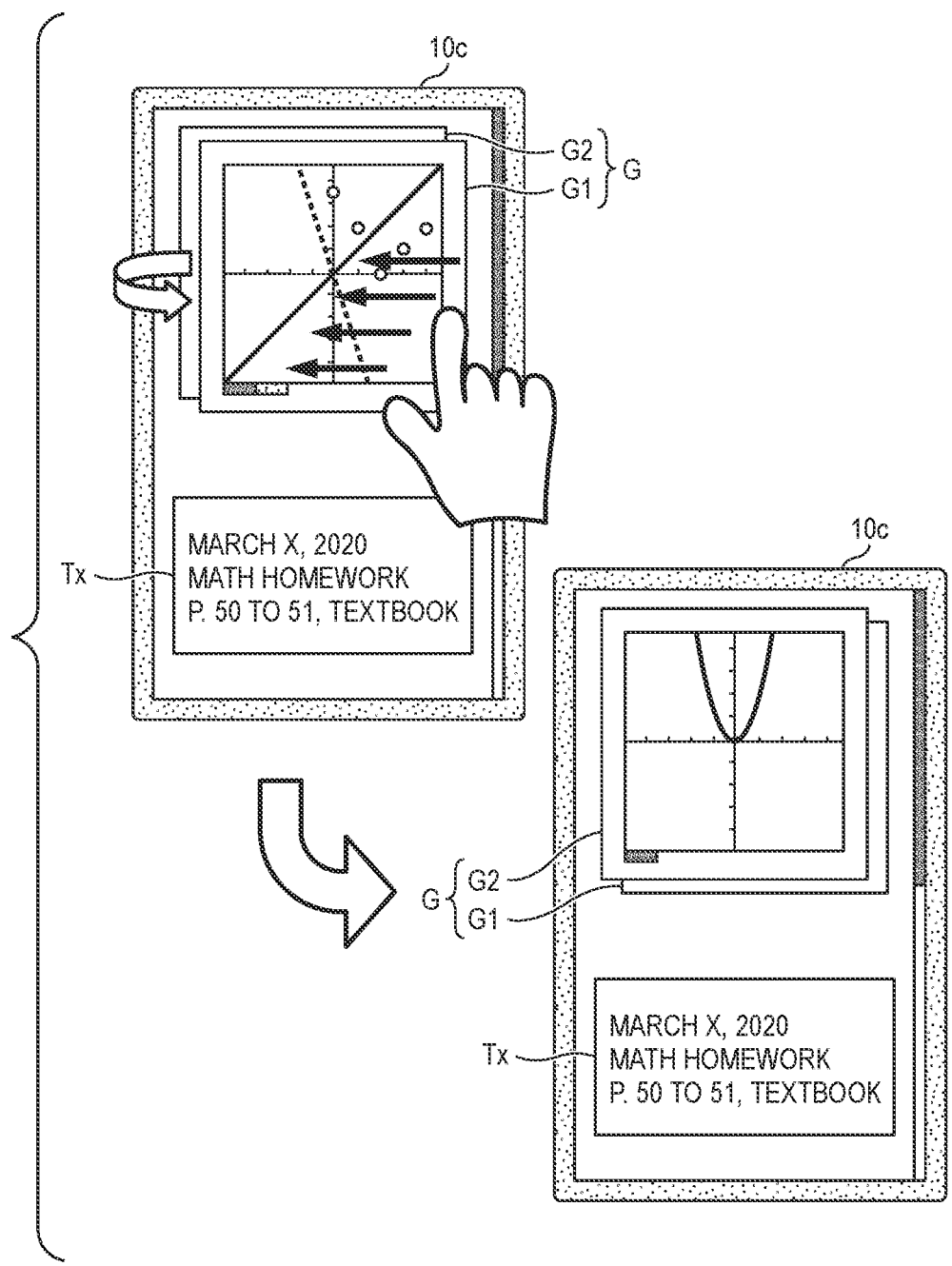
FIG. 19 is a diagram showing an example of an operation on an application screen including a comment sticky note displayed on the client terminal having a relatively small screen size.

An application screen displayed in a window W5 shown in FIG. 18 is an example of an application screen displayed on the client terminal 10 having a relatively large screen size. The application screen differs from the application screen shown in FIG. 4 in that a comment sticky note Tx that is not associated with other sticky note objects is provided and that a menu M5 is provided in the menu list M. The menu M5 is a menu for adding a comment sticky note. FIG. 19 shows a state in which a plurality of sticky note objects including the comment sticky note Tx are displayed in the first display mode. Since the comment sticky note Tx does not belong to a specific association group, the comment sticky note Tx may be displayed together with all association groups in the first display mode as shown in FIG. 19. That is, in the first display mode, sticky note objects belonging to a priority group and the comment sticky note Tx may be preferentially displayed.

The embodiments described above described an example in which an arrangement order of classification groups is not changed before and after switching the priority group, and the arrangement order of the classification groups may be determined every time the priority group is switched. For example, the arrangement order of the classification groups may be determined from coordinate information of sticky note objects belonging to the priority group. More specifically, the arrangement order obtained by arranging the sticky note objects belonging to the priority group in order of closeness to the reference coordinates may be adopted.

In the above-described embodiments, the same function may be executed based on a tap operation of a specific icon displayed on the display device or an operation using a specific key provided in the client terminal 10, instead of a flick operation and a swipe operation.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-054582, filed Mar. 25, 2020 which is hereby incorporated by reference wherein in its entirety.

The invention claimed is:

1. A display control method performed by a computer, the display control method comprising:
generating, based on a plurality of inputs including a first input of a first mathematical function and a second input of a second mathematical function input by a user, a plurality of display elements including:
a first display element expressing the first input in a first form;
a second display element expressing the first input in a second form other than the first form;
a third display element expressing the first input in a third form other than the first form and second form;
a fourth display element expressing the second input in the first form;
a fifth display element expressing the second input in the second form; and
a sixth display element expressing the second input in the third form;
in response to identifying display elements of the plurality of display elements that express matching forms, creating a first classification group in which the first display element and the fourth display element are grouped, a second classification group in which the second display element and the fifth display element are grouped, and a third classification group in which the third display element and the sixth display element are grouped;
identifying associated mathematical elements included in the plurality of display elements, and creating a plurality of association groups in response to the identifying; and
in response to a user input, switching between displaying in a first display mode in which display of a first association group of the plurality of association groups including the first, the second and the third display elements is prioritized and displaying in a second display mode in which display of a second association group of the plurality of association groups including the fourth, the fifth and the sixth display elements is prioritized,
wherein in each of the first and second display modes, the first to sixth display elements are arranged to display the plurality of classification groups aligned in a predetermined direction on a surface of a display.

2. The display control method according to claim 1,
wherein each of the associated mathematical elements is a mathematical element selected from a graph, a mathematical expression, and a numerical table,
wherein the mathematical element is capable of being associated with another predefined mathematical element,
wherein the plurality of display elements are grouped into the plurality of classification groups by a classification of the mathematical element, and
wherein the plurality of display elements are grouped into the plurality of association groups by association among a plurality of mathematical elements included in the plurality of display elements.

3. The display control method according to claim 1,
wherein in the first display mode, the first association group that is prioritized together is displayed foremost among the first and second association groups.

4. The display control method according to claim 1,
wherein in the first display mode, the second association group is minimized and displayed, or the second association group is not displayed.

5. The display control method according to claim 1,
wherein the aligning includes arranging the plurality of classification groups in a longitudinal direction of a display region of the display.

6. The display control method according to claim 5, further comprising performing a resizing processing in which, by resizing at least a part of the plurality of display elements, a width of the plurality of display elements in a direction perpendicular to the longitudinal direction of the display region of the display is within a width of the display region of the display in the perpendicular direction.

7. The display control method according to claim 1, wherein the user input includes a flick operation or a swipe operation.

8. The display control method according to claim 7, further comprising:
   determining whether a predefined condition is satisfied;
   executing the aligning and the displaying in the first display mode in a case where the predefined condition is determined to be satisfied; and
   displaying the plurality of display elements on the display in the second display mode in a case where the predefined condition is determined not to be satisfied.

9. The display control method according to claim 8, further comprising determining the first association group that is prioritized in the first display mode based on arrangements of the plurality of display elements in the second display mode.

10. The display control method according to claim 8, further comprising, upon receiving an operation of adding a new display element while the plurality of display elements are displayed on the display in the first display mode, storing classification information for specifying a classification of the added new display element in a storage.

11. The display control method according to claim 10, further comprising, before the new display element is displayed on the display in the second display mode, associating arrangement information for specifying an arrangement of the new display element in the second display mode with the classification information for specifying the classification of the new display element, and storing the arrangement information in the storage.

12. The display control method according to claim 11, wherein storing the arrangement information in the storage includes creating the arrangement information for specifying the arrangement of the new display element such that the new display element is arranged in a position where the new display element does not overlap with any of the plurality of display elements in the second display mode.

13. The display control method according to claim 8, wherein determining whether the predefined condition is satisfied includes acquiring information on a terminal including the display, and
   wherein the predefined condition is a condition that the terminal is estimated to be a smartphone based on the information on the terminal.

14. A non-transitory computer-readable storage medium storing a program that causes a computer to at least execute:
   generating, based on a plurality of inputs including a first input of a first mathematical function and a second input of a second mathematical function input by a user, a plurality of display elements including:
      a first display element expressing the first input in a first form;
      a second display element expressing the first input in a second form other than the first form;
      a third display element expressing the first input in a third form other than the first form and second form;
      a fourth display element expressing the second input in the first form;
      a fifth display element expressing the second input in the second form; and
      a sixth display element expressing the second input in the third form;
   in response to identifying display elements of the plurality of display elements that express matching forms, creating a first classification group in which the first display element and the fourth display element are grouped, a second classification group in which the second display element and the fifth display element are grouped, and a third classification group in which the third display element and the sixth display element are grouped;
   identifying associated mathematical elements included in the plurality of display elements, and creating a plurality of association groups in response to the identifying; and
   in response to a user input, switching between displaying in a first display mode in which display of a first association group of the plurality of association groups including the first, the second and the third display elements is prioritized and displaying in a second display mode in which display of a second association group of the plurality of association groups including the fourth, the fifth and the sixth display elements is prioritized,
   wherein in each of the first and second display modes, the first to sixth display elements are arranged to display the plurality of classification groups aligned in a predetermined direction on a surface of a display.

15. A system comprising:
a processor configured to:
   generate, based on a plurality of inputs including a first input of a first mathematical function and a second input of a second mathematical function input by a user, a plurality of display elements including:
      a first display element expressing the first input in a first form;
      a second display element expressing the first input in a second form other than the first form;
      a third display element expressing the first input in a third form other than the first form and second form;
      a fourth display element expressing the second input in the first form;
      a fifth display element expressing the second input in the second form; and
      a sixth display element expressing the second input in the third form;
   in response to identifying display elements of the plurality of display elements that express matching forms, create a first classification group in which the first display element and the fourth display element are grouped, a second classification group in which the second display element and the fifth display element are grouped, and a third classification group in which the third display element and the sixth display element are grouped;
   identify associated mathematical elements included in the plurality of display elements, and create a plurality of association groups in response to the identifying; and
   in response to a user input, switch between displaying in a first display mode in which display of a first association group of the plurality of association groups including the first, the second and the third display elements is prioritized and displaying in a second display mode in which display of a second association group of the plurality of association groups including the fourth, the fifth and the sixth display elements is prioritized, wherein in each of the first and second display modes, the first to sixth display elements are arranged to display the plurality of classification groups aligned in a predetermined direction on a surface of a display.

\* \* \* \* \*